United States Patent [19]

Berr et al.

[11] 4,294,938

[45] Oct. 13, 1981

[54] THERMAL STABILIZATION OF POLYALKYLENE TEREPHTHALATE RESIN COMPOSITIONS

[75] Inventors: Charles E. Berr, Wilmington, Del.; Edward J. Deyrup, Northeast, Md.

[73] Assignee: E. I. Du Pont de Nemours and Company, Wilmington, Del.

[21] Appl. No.: 122,063

[22] Filed: Feb. 15, 1980

[51] Int. Cl.³ .................... C08L 67/02; C08L 23/26
[52] U.S. Cl. .................................. 525/101; 525/176; 525/446
[58] Field of Search .................. 525/101, 176, 446

[56] References Cited

U.S. PATENT DOCUMENTS

| | | | |
|---|---|---|---|
| 3,673,146 | 6/1972 | Factor | 260/37 PC |
| 3,742,083 | 6/1973 | Bialous | 260/45.75 R |
| 3,742,085 | 6/1973 | Bialous | 260/45.75 R |
| 3,849,152 | 11/1974 | Mimeault | 106/308 Q |
| 3,960,985 | 6/1976 | Cooper . | |
| 4,073,827 | 2/1978 | Okasaka et al. | 525/176 |
| 4,219,628 | 8/1980 | Weemes et al. | 525/176 |

FOREIGN PATENT DOCUMENTS 2856270  7/1979  Fed. Rep. of Germany ...... 525/176

Primary Examiner—Wilbert J. Briggs, Sr.

[57] ABSTRACT

Polyalkylene terephthalate molding blends with ionic hydrocarbon polymers as toughening agents are protected against thermal degradation and discoloration by the presence of a selected silicone resin.

9 Claims, No Drawings

THERMAL STABILIZATION OF POLYALKYLENE TEREPHTHALATE RESIN COMPOSITIONS

FIELD OF THE INVENTION

This invention relates to polyalkylene terephthalate molding blends which contain ionic hydrocarbon copolymers of α-olefins and α,β-ethylenically unsaturated acids. More particularly, this invention relates to such blends which also contain a silicone resin.

BACKGROUND

Ionic hydrocarbon copolymers are added to polyalkylene terephthalate resins for two reasons. First, the ductility of articles molded from the resin can be enhanced by adding an ionic hydrocarbon copolymer of an α-olefin and an α,β-ethylenically unsaturated organic acid. Second, molded articles having smooth glossy surfaces can be obtained at unusually low mold temperatures for polyethylene terephthalate (i.e., below 110° C.) if certain materials (such as low molecular weight esters, ketones, amides, etc.) are added to the polyethylene terephthalate in conjunction with a selected ionic hydrocarbon copolymer.

However, presence of the ionic hydrocarbon copolymer causes articles molded from the resin to discolor somewhat as the article is subjected to heat in the presence of air. An agent which inhibits such darkening is desirable.

SUMMARY OF THE INVENTION

It has now been discovered that presence of a small amount of a silicone resin effectively inhibits the discoloration in air at elevated temperatures of articles molded from polyalkylene terephthalate resins which contain the ionic hydrocarbon copolymer.

Specifically, the product aspect of this invention is a molding blend comprising polyalkylene terephthalate wherein the alkylene moiety contains 2-4 carbon atoms; about 1-25 percent by weight of an ionic hydrocarbon copolymer of an α-olefin of 2-5 carbon atoms and an α,β-ethylenically unsaturated carboxylic acid of 3-5 carbon atoms in which the carboxyl groups have been partially neutralized with metal cations, said weight based on polyalkylene terephthalate and copolymer, and about 0.1-5 percent by weight of a silicone resin, said weight based on polyalkylene terephthalate and silicone resin.

In its process aspect, this invention is a process for improving the heat aging resistance to oxidative discoloration of polyalkylene terephthalate resins which contain an ionic hydrocarbon copolymer defined above, which process comprises admixing said resin and ionic hydrocarbon copolymer with about 0.1-5 percent by weight silicone resin based on weight of polyalkylene terephthalate, copolymer and silicone resin.

DESCRIPTION OF THE INVENTION

The polyalkylene terephthalate employed herein is one which has an inherent viscosity of at least 0.4 as measured by ASTM D-2857. The polyalkylene terephthalate preferably has an upper limit on inherent viscosity of about 1.2. Inherent viscosity is measured in a 3:1 by volume ratio of methylene chloride and trifluoroacetic acid at 30° C. The polyalkylene terephthalate can contain minor amounts of other comonomers such as diethylene glycol or glutaric acid.

The ionic hydrocarbon copolymer employed as a component of the blends of this invention is a copolymer of an α-olefin having the formula $R-CH=CH_2$ wherein R is a radical selected from the class consisting of hydrogen and alkyl radicals containing 1-3 carbon atoms, and α,β-ethylenically unsaturated carboxylic acids containing 3-5 carbon atoms. The α-olefin content of the copolymer is preferably at least 70 mole percent.

The carboxylic acid groups are randomly distributed over the copolymer molecules and can be neutralized or partially neutralized by metal cations distributed over the carboxylic acid groups of the copolymer. The metal cations can be derived from metals selected from the class consisting of Groups I, II, and IV of the Periodic Table.

Illustrative of the α-olefins useful in the preparation of the ionic copolymer component of the blends of this invention are ethylene, propylene, butene-1 and pentene-1. Illustrative of α,β-ethylenically unsaturated carboxylic acids useful in the preparation of said ionic copolymer are acrylic acid, methacrylic acid, ethacrylic acid, itaconic acid, maleic acid, fumaric acid, and monoesters of itaconic acid, maleic acid, and fumaric acid. Other monomers can, of course, be polymerized in the copolymer.

The copolymerization of the α-olefin and the carboxylic acid monomers can be conducted in a one-phase system, that is, in a medium, such as benzene or ethylene, in which the monomers are soluble. The medium may be in either liquid or vaporized form. Preferably, and especially when relatively small amounts of the carboxylic acid component are desired in the copolymer, the process can be continuous, the monomers being fed into the reactor in the ratio of their relative polymer-forming reactivities, and the residence time in the reactor being limited to prevent all the alkylene monomer feed from being converted into polymer.

When the ionic copolymer is used to toughen polyalkylene terephthalate, it can be present in an amount of 1-25 percent by weight based on weight of the polyester and copolymer, and preferably 2-20 percent.

When the ionic copolymer is present as part of the system added to achieve good gloss and smooth surfaces with polyethylene terephthalate at low mold temperatures, it will be present in an amount of about 1-12 percent by weight of the polyester and copolymer, and the cation will be sodium or potassium. In this embodiment, the blend also contains 1-12 percent of a low molecular weight organic ester, ketone, sulfone, amide, sulfoxide or nitrile, based on weight of polyethylene terephthalate and low molecular weight compound. The combination of the ionic copolymer and the low molecular weight compound increases crystallization of the polyester. The low molecular weight compound can be exemplified by organic esters. Preferred esters are selected from the product of an aromatic carboxylic acid of 7-11 carbon atoms containing at least 1 carboxyl group per aromatic nucleus and an alcohol selected from those of the formula $(HOCH_2)_xR'$ wherein x is 1, 2 or 3 and R' is a hydrocarbon radical of 2-15 carbon atoms (preferably 2-10 carbon atoms) or those of the formula $HO(R''O)_yR'''$ wherein y is a cardinal number between 1 and 15 and preferably between 2 and 8, R'' is a hydrocarbon radical of 2-15 carbon atoms (preferably 2-8 carbon atoms) and R''' is —H or a hydrocarbon radical of 2-20 carbon atoms (preferably 2-12 carbon atoms); organic ketones of the formula $$\underset{RCR}{\overset{O}{\parallel}}$$

organic sulfones of the formula RSOOR; organic sulfoxides of the formula $R_2SO$; organic nitriles of the formula RCN; or organic amides of the formula $$\underset{RCNR'R}{\overset{O}{\parallel}} \text{ or } \underset{RSONR'R}{\overset{O}{\parallel}}$$

wherein each R can be the same as or different from any other R and is a hydrocarbyl group of 1-25 carbon atoms, and R' is hydrogen or a hydrocarbyl group of 1-25 carbon atoms. The amount of this combination can vary between about 1-12 percent based on weight of polyethylene terephthalate and copolymer depending upon its efficiency as a crystallization promotor.

The blends of this invention can, and in the case of the system which produces good gloss at low mold temperatures generally do, contain up to 50 percent by weight of a reinforcing or filling material such as glass fibers, glass beads, aluminum silicate, asbestos, mica and the like, or combinations thereof as, for example, a mixture of mica and glass fibers.

In addition to the components discussed hereinabove, the polyalkylene terephthalate blends may contain additives commonly employed with polyester resins, such as colorants, nucleating agents, mold release agents, antioxidants, ultraviolet light stabilizers, flame retardants and the like. Additives which improve physical properties, such as tensile strength and elongation can also be employed; such additives include epoxy compounds (e.g., an epoxy compound formed from bisphenol-A and epichlorohydrin) present in amount of from 0.1-1.5 percent by weight based on weight of composition.

In a preferred embodiment, the ionic copolymer comprises an ethylene/methacrylic acid copolymer comprising 80-97 weight percent ethylene and 3-20 weight percent methacrylic acid, in which the carboxylic acid groups of the ethylene/methacrylic acid copolymer are neutralized to the extent of at least 25 percent. The preferred cations used in the neutralization of said carboxylic acid groups are $Na^+$, $K^+$, $Ca^{++}$, $Mg^{++}$, $Zn^{++}$, and $Pb^{++}$ for toughening purposes. For better crystallization, $Na^+$ and $K^+$ ions are used.

The silicone resins that have been found to inhibit the discoloration of articles molded from the resin blends described above are defined by the formula $$R_3SiO\left[\begin{array}{c}R'\\|\\Si-O\\|\\R''\end{array}\right]_n SiR_3$$

wherein R' and R" are each independently a hydrocarbyl group of 1-20 carbon atoms and one of R' and R" can be hydrogen, n is an integer of between about 5 and 5000, preferably between 10 and 2000, and most preferably between 10 and 100 and R is lower (i.e., 1-4 carbon atoms) alkyl or phenyl. The silicone resin can be a homopolymer or copolymer with another silicone resin having different hydrocarbyl R' and R" substituents. Preferably R' and R" are each independently alkyl of 1-10 carbon atoms, aryl of 6-10 carbon atoms, alkaryl of 7-11 carbon atoms, or aralkyl of 7-11 carbon atoms.

Representative of the silicone resins are phenyl methyl siloxane, dimethyl siloxane, monophenyl siloxane, propyl-modified phenyl siloxane, and a copolymer of phenyl methyl siloxane and dimethyl siloxane.

Preferably the silicone resin will be present in an amount of between 0.3 and 2 percent by weight of polyethylene terephthalate and silicone resin and will have a viscosity of between 10,000 and 100,000 centistokes as measured on a Brookfield viscometer.

The compositions of this invention are prepared by blending the components together by any convenient means. Neither temperature nor pressure are critical. For example, the polyalkylene terephthalate can be mixed dry in any suitable blender or tumbler with the additional components except reinforcing agent and the mixture melt-extruded. The extrudate can be chopped and mixed with reinforcing agent and then this mixture melt-extruded. Alternatively, all the components can be mixed dry in any suitable blender or tumbler and the mixture then melt-extruded.

EXPLANATION OF EXAMPLES

In the following Examples, the term Ionic Copolymer means a partially sodium neutralized 15 percent methacrylic acid copolymer of ethylene, "DNG" means the dibenzoate of neopentyl glycol, "PA" means a phenolic antioxidant, and "Epoxide" means a bisphenol-A-glycidyl ether epoxy resin with an epoxy equivalent weight of 2500-4000, DC-200 is poly (dimethyl siloxane), while DC-550 is poly (methyl phenyl siloxane).

Tensile strength and elongation of bars molded in the Examples were determined via ASTM D-638. The Izod impact was determined via ASTM D-256, method E, except that bars were not notched (initial notched Izod values are insensitive for glass-filled blends and it is difficult to detect significant changes during air oven aging). All bars aged and tested were ⅛" in thickness.

Discoloration of the samples during air oven aging was monitored by reflectance on a D-25 Hunter Colorimeter. Color values as measured on the Hunter D-25 are relative to the absolute value of the perfect white diffuser as measured under the same geometric conditions (see ASTM Method E306), according to the recommendation of the International Commission on Illumination of Jan. 1, 1969.

The scale used herein to measure the color values is the Hunter L,a,b scale. The L,a,b scale was designed to give measurements of color in units of approximate visual uniformity throughout the color solid. Thus, L measures lightness and varies from 100 for perfect white to zero for black, approximately as the eye would evaluate it. The chromaticity dimensions (a and b) give understandable designations of color as follows:

a measures redness when plus, gray when zero and greenness when minus.

b measures yellowness when plus, gray when zero and blueness when minus.

The relationships between L,a,b values and CIE X,Y,Z values are as follows:

$$L = 10\sqrt{Y} \qquad Y = .01L^2$$

$$a = 17.5 \frac{(1.02X - Y)}{\sqrt{Y}} \qquad X = \left[ .01L^2 + \frac{aL}{175} \right] .98041$$

$$b = 7.0 \frac{(Y - .847Z)}{\sqrt{Y}} \qquad Z = \left[ .01L^2 - \frac{bL}{70} \right] 1.18103$$

The source-photodetector-filter combination in the Hunter D-25 Colorimeter is designed to simulate the color matching response functions of the human observer, as defined by the 1931 CIE 2° Standard Observer. The relationship between CIE X,Y,Z values and the x,y chromaticity coordinates is as follows:

$$x = \frac{X}{X + Y + Z} \qquad y = \frac{Y}{X + Y + Z}$$

The procedure employed in the Examples is described as follows:

A mixture of polyethylene terephthalate resin of inherent viscosity 0.60 (at 0.5% in methylene chloride/trifluoroacetic acid (3/1) at 30° C.), Ionic Copolymer, DNG, PA, Epoxide and chopped glass fibers (Owens-Corning Fiberglass Type 277B) was tumbled manually in a nitrogen-filled polyethylene bag, then extruded at 290°-295° C. through a 2-stage, single screw Sterling extruder using 20-25" vacuum at a vent port to remove volatiles. The extruded strands were partially cooled in a water bath, and chopped up into pellets between about ⅛"-3/16" on one edge. The pellets were further blended manually.

The blended pellets were molded into test bars at a melt temperature of 290°-300° C. with a mold temperature at 95°-100° C.

EXAMPLES

The blends listed in Table I were prepared and molded via the procedure recited above. Some were lacking in the Ionic Copolymer, DNG or PA component and most contained 0.25-1.0% by weight of a high viscosity silicone resin, either Dow-Corning 200 or 550. Blends which are blends of this invention are designated by numerals, while comparison blends are designated by letters.

Bars molded from the blends were aged in 170° C. air in a forced draft circulating air oven and checked periodically. Referring to Table I, it is seen that blends lacking the Ionic Copolymer did not darken significantly, becoming a light tan after four months whether silicone was present or not. Blends containing Ionic Copolymer but no silicone resin darkened rapidly becoming nearly black in less than a month. However, the presence of even 0.25% of a silicone resin such as DC-200 inhibited the darkening significantly. Blends containing both Ionic Copolymer and 0.25-1.0% DC-200 did not darken much more after 4 months than blends containing no Ionic Copolymer (Table I). The data of Table I indicate that bars containing the silicone resin stabilizers exhibit tensile and impact properties as good as, and in some cases better than, bars lacking the silicone resin, both as molded and after oven aging.

TABLE I

EFFECT OF SILICONE RESINS ON AIR OVEN AGING OF POLYESTER-GLASS RESINS

| Experiment | Polyester Type | % | Ionic Co- % | DNG % | PA % | Epoxide |
|---|---|---|---|---|---|---|
| A | PET | 70 | 30 | 0 | 0 | 0 |
| B | PET | 70 | 30 | 0 | 0 | 0 |
| C | PET | 61.4 | 30 | 3.8 | 3.9 | 0.28 | 0.6 |
| D | PET | 61.4 | 30 | 3.8 | 3.9 | 0.28 | 0.6 |
| 1 | PET | 60.9 | 30 | 3.8 | 3.9 | 0.28 | 0.6 |
| E | PET | 65.0 | 30 | 0 | 3.9 | 0 | 0.6 |
| 2 | PET | 65.1 | 30 | 3.8 | 0 | 0 | 0.6 |
| 3 | PET | 65.4 | 30 | 3.8 | 0 | 0.28 | 0 |
| 4 | PET | 65.1 | 30 | 3.8 | 0 | 0.28 | 0.6 |
| 5 | PET | 64.8 | 30 | 3.8 | 0 | 0.28 | 0.6 |
| 6 | PET | 64.3 | 30 | 3.8 | 0 | 0.28 | 0.6 |
| 7 | PET | 64.3 | 30 | 3.8 | 0 | 0.28 | 0.6 |
| 8 | PET | 61.8 | 30 | 3.8 | 3.9 | 0.28 | 0.6 |
| 9 | PET | 60.9 | 30 | 3.8 | 3.9 | 0.28 | 0.6 |
| 10 | PET | 60.9 | 30 | 3.8 | 3.9 | 0.28 | 0.6 |
| 11 | PET | 60.4 | 30 | 3.8 | 3.9 | 0.28 | 0.6 |
| 12 | PET | 60.4 | 30 | 3.8 | 3.9 | 0.28 | 0.6 |

| % Silicone DC-200 | % Silicone DC-550 | Oven aging months 170° C. | Color | Colorimeter values L | a | b |
|---|---|---|---|---|---|---|
| 0 | 0 | 0 | White (control) | 78.0 | −1.7 | 7.1 |
| 0 | 0 | 4 | L. Tan | 64.0 | 4.8 | 15.5 |
| 0 | 0 | 0 | White (control) | 77.0 | −2.1 | 8.6 |
| 0 | 0 | 4 | Black | 24.4 | 1.9 | 0.8-1.1 |
| 0.5 | 0 | 0 | White (control) | 78.3 | −1.7 | 7.2 |
| 0.5 | 0 | 4 | L. Tan | 51.1 | 6.5 | 15.1 |
| 0.5 | 0 | 4 | Tan | 50.4 | 6.7 | 16.2 |
| 0.5 | 0 | 4 | L. Tan | 53.3 | 6.3 | 14.9 |
| 0.25 | 0 | 4 | Tan | 45.2 | 8.3 | 15.8 |
| 0.5 | 0 | 4 | Tan | 47.8 | 7.9 | 16.6 |
| 1.0 | 0 | 4 | L. Tan | 51.7 | 7.4 | 16.9 |
| 0 | 1.0 | 4 | Tan | 48.8 | 7.2 | 15.7 |
| 0.25 | 0 | 4 | Tan | 47.9 | 8.2 | 16.6 |
| 0.5 | 0 | 4 | Tan | 46.2 | 8.5 | 15.6 |
| 0.5 | 0 | 4 | Tan | 50.2 | 8.0 | 16.8 |
| 1.0 | 0 | 4 | L. Tan | 52.3 | 7.7 | 17.5 |
| 0 | 1.0 | 4 | Tan | 46.2 | 8.0 | 16.9 |

| Experiment | Unnotched Izod Impact (ft-lb/in) | Tensile Strength (Kpsi) | % Elongation |
|---|---|---|---|
| A | — | — | — |
| B | — | — | — |
| C | 15.1-17.4 | 23.0 | 2.75 |
| D | 3.6-4.5 | 12-13 | 1.1-1.3 |
| 1 | 19.3 | 22.7 | 2.80 |
| 2 | 4.6 | 11.4 | 1.1 |
| E | 4.9 | 13.7 | 1.0 |
| 3 | 3.9 | 12.7 | 1.0 |
| 4 | 5.0 | 13.9 | 1.1 |
| 5 | 5.7 | 13.3 | 1.0 |
| 6 | 4.9 | 15.0 | 1.1 |
| 7 | 5.2 | 14.2 | 1.0 |
| 8 | 5.6 | 14.1 | 1.1 |
| 9 | 6.6 | 14.7 | 1.5 |
| 10 | 5.6 | 14.1 | 1.2 |
| 11 | 5.8 | 14.2 | 1.1 |
| 12 | 5.3 | 14.4 | 1.1 |

EXAMPLE 13

In this Example, blends were prepared and molded as described in the procedure recited above using the components shown in Table II.

The data of Table II show that the color stabilizing effect of the silicone resin is essentially unaffected by the binder on the glass used in the blends. Sample 13-2 contained standard chopped glass fibers treated by the manufacturer with a special sizing, probably an aminosilane, while Sample 13-1 contained the same glass which had been heat-treated to remove the binder.

Sample 13-3 vs. Sample 13-2 of Table II shows that a 10-fold increase in silicone content has only a minor effect on color stabilization of the resins during air oven aging.

TABLE II
EFFECT OF GLASS TYPE ON INHIBITION OF DISCOLORATION OF IONIC COPOLYMER AND SILICONE-CONTAINING POLYESTER RESINS DURING AIR OVEN AGING

| Example 13 | % PET | % Ionic Copolymer | Glass (30 Wt %) Type | % Silicone (DC-200) |
|---|---|---|---|---|
| A | 66.2 | 3.8 | Heat-Treated* OCF 419AA | 0 |
| 13-1 | 65.7 | 3.8 | Heat-Treated* OCF 419AA | 0.5 |
| 13-2 | 65.7 | 3.8 | Standard OCF 419AA | 0.5 |
| 13-3 | 60.92 | 3.8 | Standard OCF 419AA | 5.0 |

| Other Components | Time in 170° C. Oven | Color | Colorimeter Values L | a | b |
|---|---|---|---|---|---|
| 0 | 0 | Gray-White | 56.3 | −0.9 | −0.4 |
|  | 2 Weeks | Black | 20.9 | +0.5 | +1.2 |
| 0 | 0 | White | 63.8 | −0.5 | +1.0 |
|  | 2 Weeks | Tan | 36.0 | +1.6 | +7.5 |
| 0 | 0 | White | 63.0 | −1.6 | +6.1 |
|  | 2 Weeks | Tan | 34.6 | +1.5 | +7.5 |
| 0.28% PA | 0 | White | 70.0 | −0.6 | +3.2 |
|  | 2 Weeks | Tan | 39.6 | +3.3 | +8.5 |

*Heat treatment removes the binder (probably an aminosilane) applied by the manufacturer.

EXAMPLE 14

In this Example, blends were prepared and molded as described in the procedure recited above using the components shown in Table III.

The data of Table III indicate that the silicone resin additives exert a color stabilization effect in the absence of the glass filler.

TABLE III
EFFECT OF SILICONE RESIN ON AIR OVEN AGING OF GLASS-FREE POLYESTER/IONIC COPOLYMER BLENDS

| Experiment | % PET | % Ionic Copolymer | % DNG | % PA | % Epoxide | % Silicone (DC-200) |
|---|---|---|---|---|---|---|
| 14-A | 100 | 0 | 0 | 0 | 0 | 0 |
| 14-B | 100 | 0 | 0 | 0 | 0 | 0 |
| 14-C | 96.2 | 3.8 | 0 | 0 | 0 | 0 |
| 14-D | 96.2 | 3.8 | 0 | 0 | 0 | 0 |
| 14-1 | 95.7 | 3.8 | 0 | 0 | 0 | 0.5 |
| 14-2 | 95.7 | 3.8 | 0 | 0 | 0 | 0.5 |
| 14-3 | 95.5 | 3.8 | 0 | 0.2 | 0 | 0.5 |
| 14-4 | 95.5 | 3.8 | 0 | 0.2 | 0 | 0.5 |
| 14-E | 96.0 | 3.8 | 0 | 0.2 | 0 | 0 |
| 14-F | 96.0 | 3.8 | 0 | 0.2 | 0 | 0 |

| Experiment | Time Aged in 170° C. oven | Color | Colorimeter Values L | a | b |
|---|---|---|---|---|---|
| 14-A | 0 (control) | White | 78.0 | −1.7 | 7.1 |
| 14-B | 4 mo. | L. Tan | 64.0 | 4.8 | 15.5 |
| 14-C | 0 (control) | White | 77.0 | −2.1 | 8.5 |
| 14-D | 1 mo. | Black | 20.2 | 2.3 | 0.6 |
| 14-1 | 0 (control) | White | 77.1 | −2.1 | 8.6 |
| 14-2 | 1 mo. | Brown | 36.8 | 3.9 | 6.9 |
| 14-2 | 3 mo. | Brown | 36.3 | 6.5 | 10.6 |
| 14-3 | 0 (control) | White | 77.0 | −2.2 | 8.4 |
| 14-4 | 1 mo. | Tan | 37.2 | 3.6 | 6.9 |

TABLE III-continued
EFFECT OF SILICONE RESIN ON AIR OVEN AGING OF GLASS-FREE POLYESTER/IONIC COPOLYMER BLENDS

| 14-4 | 3 mo. | Tan | 37.1 | 5.4 | 9.7 |
| 14-E | 0 (control) | White | 80.8 | −1.4 | 9.3 |
| 14-F | 1 mo. | Black | 23.6 | 2.5 | 1.3 |
| 14-F | 3 mo. | Black | 23.2 | 2.7 | 1.3 |

We claim:

1. A molding composition comprising (a) polyalkylene terephthalate having an inherent viscosity of at least 0.4 wherein the alkylene moiety contains 2–4 carbon atoms, (b) 0–50% by weight of reinforcing material, said weight based on polyalkylene terephthalate and reinforcing material, (c) 1–25% by weight of an ionic hydrocarbon copolymer of an α-olefin of 2–5 carbon atoms and an α,β-ethylenically unsaturated carboxylic acid of 3–5 carbon atoms in which the carboxyl groups have been partially neutralized with metal cations, said weight based on polyalkylene terephthalate and copolymer, and (d) 0.1–5% by weight of a silicone resin of the general formula

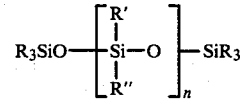

wherein R is lower alkyl or phenyl, R' and R" are each independently a hydrocarbyl group of 1–20 atoms and one of R' and R" can be hydrogen, and n is an integer of between about 5 and 500, said weight based on polyalkylene terephthalate and silicone resin.

2. The composition of claim 1 wherein the polyalkylene terephthalate is polyethylene terephthalate.

3. The composition of claims 1 or 2 wherein the ionic hydrocarbon copolymer is a copolymer of ethylene and methacrylic acid in which the carboxyl groups are partially neutralized with sodium or potassium.

4. The composition of claims 1 or 2 wherein the silicone resin is a poly(dimethylsiloxane) of between 10,000–100,000 centistokes viscosity.

5. The composition of claim 3 wherein the silicone resin is a poly(dimethylsiloxane) of between 10,000–100,000 centistokes viscosity.

6. A molding composition comprising (a) polyethylene terephthalate having an inherent viscosity of at least 0.4; (b) 0–50% by weight of reinforcing material, said weight based on polyethylene terephthalate and reinforcing material, (c) 1–12% by weight of an ionic hydrocarbon copolymer of an α-olefin, of 2–5 carbon atoms and an α,β-ethylenically unsaturated carboxylic acid of 3–5 carbon atoms in which the carboxyl groups have been partially neutralized with Na+ of K+ cations, said weight based on polyethylene terephthalate and copolymer, (d) 0.1–5% by weight of a silicone resin of the general formula

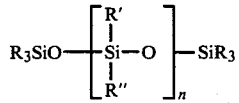

wherein R is lower alkyl or phenyl, R' and R" are each independently a hydrocarbyl group of 1–20 atoms and one of R' and R" can be hydrogen, and n is an integer of between about 5 and 500, said weight based on polyethylene terephthalate and silicone resin, (e) 1–12 percent by weight of a low molecular weight compound selected from an organic ester, ketone, sulfone sulfoxide, nitrile or amide.

7. The composition of claim 6 wherein the ionic hydrocarbon copolymer is a copolymer of ethylene and methacrylic acid in which the carboxyl groups are partially neutralized with sodium.

8. The compositions of claims 6 or 7 wherein the compound of component (e) is an organic ester of an aromatic carboxylic acid of 7–11 carbon atoms containing at least 1 carboxyl group per aromatic nucleus and an alcohol selected from those of the formula $(HOCH_2)_xR'$ wherein x is 1, 2 or 3 and $R'$ is a hydrocarbon radical of 2–15 carbon atoms, of those of the formula $HO(R''O)_yR'''$ wherein y is a cardinal number between 1 and 15, $R''$ is a hydrocarbon radical of 2–15 carbon atoms, and $R'''$ is —H or a hydrocarbon radical of 2–20 carbon atoms.

9. The composition of claims 6 or 7 wherein the silicone resin is a poly(diemethylsiloxane) of between 10,000–100,000 centistokes viscosity.

* * * * *

UNITED STATES PATENT OFFICE
CERTIFICATE OF CORRECTION

PATENT NO. : 4,294,938
DATED : October 13, 1981
INVENTOR(S) : Charles Ernest Berr and Edward Johnson Deyrup It is certified that error appears in the above—identified patent and that said Letters Patent are hereby corrected as shown below:

In Claim 1, at column 8, line 33, and in Claim 6, at column 9, line 1, in each, change "500" to -- 5000 --.

Signed and Sealed this

Twenty-sixth Day of October 1982

[SEAL]

Attest:

GERALD J. MOSSINGHOFF

Attesting Officer

Commissioner of Patents and Trademarks